Aug. 15, 1939     W. J. ZINK     2,169,890
TELESCOPING CONVEYER
Filed Feb. 21, 1938     2 Sheets-Sheet 1

Inventor
William J. Zink
By Arthur M. Hahn
Attorney

Aug. 15, 1939. W. J. ZINK 2,169,890
TELESCOPING CONVEYER
Filed Feb. 21, 1938 2 Sheets-Sheet 2
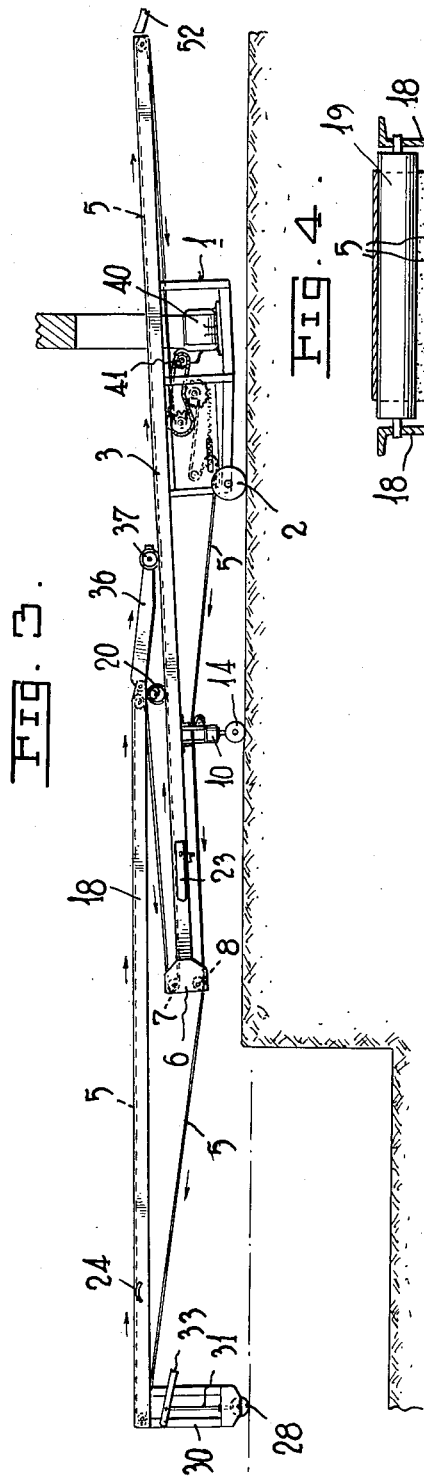
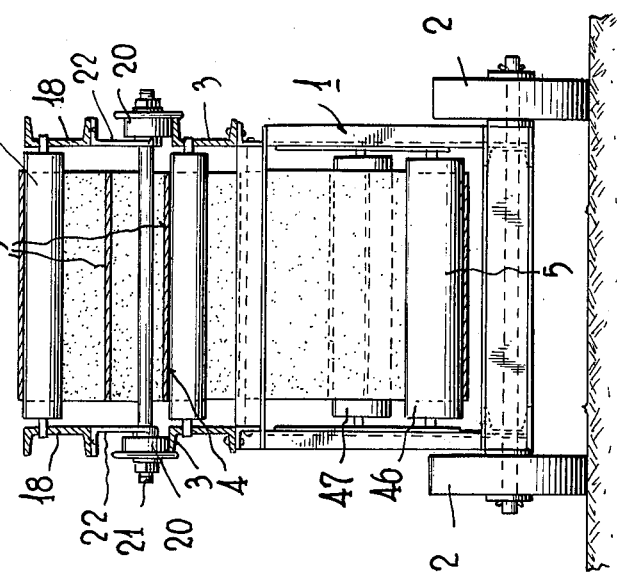
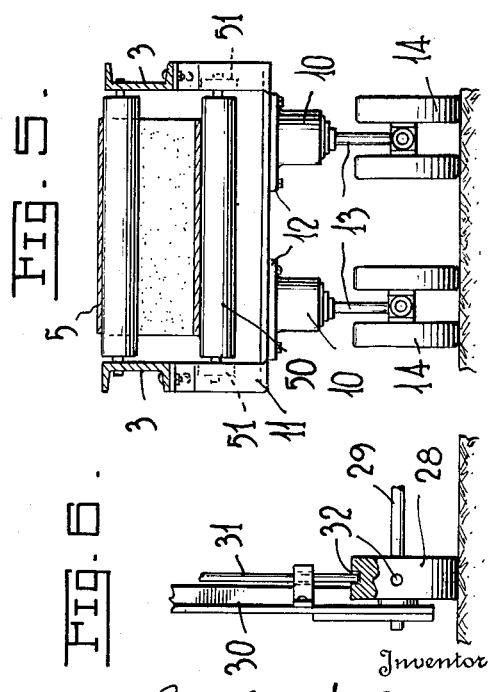
Inventor
William J. Zink
By Arthur M. Hahn
Attorney Patented Aug. 15, 1939

2,169,890

UNITED STATES PATENT OFFICE 2,169,890

TELESCOPING CONVEYER

William J. Zink, Birmingham, Ala., assignor to Mathews Conveyer Company, Ellwood City, Pa., a corporation of Pennsylvania Application February 21, 1938, Serial No. 191,799

3 Claims. (Cl. 198—139)

This invention relates to conveyers and is directed more particularly to power driven conveyers that may be telescoped.

The operation of loading or unloading ships, trucks and other carriers with respect to a storage shed or warehouse is greatly expedited if a power driven conveyer can be used to bridge the space therebetween. In some instances, where the distance between warehouse and carrier is relatively small, a portable conveyer of suitable length can be stored in the warehouse and pushed out into position to facilitate handling of the articles. In a great many instances, however, the distance between warehouse and carrier is such that a portable conveyer of this character would be too long to be easily handled and stored in the warehouse when not in use.

It is the primary object of the present invention to provide a portable telescoping conveyer which may be easily and quickly extended or retracted. The conveyer when retracted being relatively compact and occupying a small space so that it may be easily moved about or stored in a warehouse, and when extended shall materially lengthen the overall length of the conveyer so as to effectively bridge the distance between carrier and warehouse.

Another object is to provide a portable telescoping conveyer which may be extended to any desired length from minimum to maximum positions and thus render it unnecessary to accurately position the carrier with respect to the warehouse.

A further object is to provide a portable telescoping conveyer of novel construction and wherein the power driven belt shall be automatically maintained at the proper degree of tension for conveying articles, irrespective of the linear extension of the device.

A still further object is to provide a conveyer of the aforesaid character which shall be relatively simple in construction and inexpensive to manufacture and which may be easily moved about and readily extended or retracted.

With the foregoing and other objects in view, the invention may be stated to consist in the provision of a portable telescoping conveyer embodying the various novel features of construction and arrangement or combination, all of which will be fully described hereinafter and pointed out in the appended claims.

In the drawings accompanying and forming a part of this application wherein I have illustrated a specific embodiment of my invention, Figure 1 is a side elevation of a portable conveyer in the retracted position;

Figure 3 is a side elevation of the device and showing the same in extended position;

Figure 1:
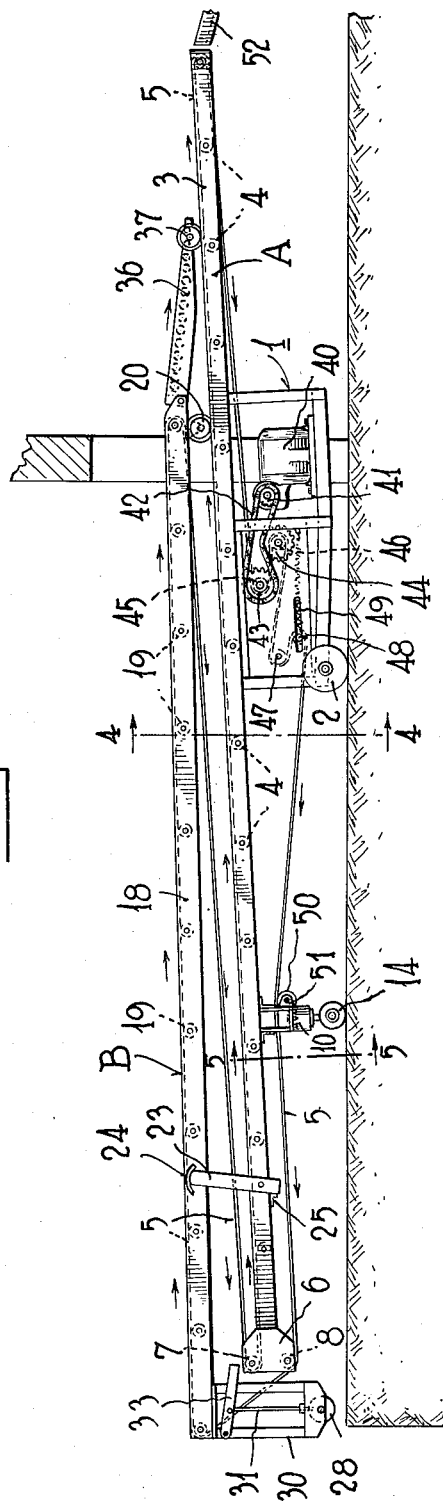
Figure 2:
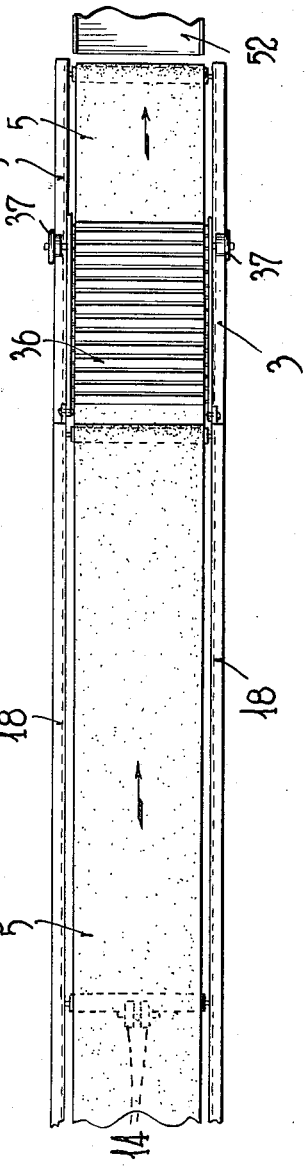
Figure 2 is a fragmentary top plan view thereof.

Figures 4 and 5 are enlarged transverse sectional views taken respectively on the lines 4—4 and 5—5 of Figure 1; and Figure 6 is a fragmentary view partly in elevation and partly in section showing the locking arrangement for the front wheel support of the conveyer.

A conveyer constructed in accordance with my invention comprises a substantially rectangular supporting framework indicated generally at 1, which is provided adjacent one end with suitable supporting wheels 2. Mounted on top of the framework is a conveyer section A consisting of a pair of transversely spaced and longitudinally extending channel members 3, 3 which are preferably arranged with the channel sides thereof facing outwardly as clearly shown in Figure 4. A plurality of rollers 4 are rotatably mounted between these channels and these rollers support along their upper surfaces, a continuous flexible conveyer belt 5. The outer or left hand end of the conveyer section A, as viewed in Figures 1 and 3, is provided with side plates 6 that extend above and below the top and bottom surfaces of the channel members 3, 3, and these plates rotatably support a pair of vertically spaced rollers 7 and 8 over which the belt 5 passes.

The outer end portion of the conveyer frame A is supported on swivel casters 10 which are shown in detail in Figure 5. A U-shaped frame 11 is bolted or otherwise secured to channel members 3, 3, and to the horizontal portion of this frame is fastened the swivel caster base plates 12. Each caster includes a vertically disposed shaft 13 which is journalled in suitable antifriction bearings within the base plate housing, and the lower end of this shaft pivotally supports an axle on which are journalled a pair of caster wheels 14. It is thus obvious that the conveyer frame A and associated parts to be described hereinafter may be easily moved about on the wheels 2 and swivel caster wheels 14, the latter permitting short turns to be made and also readily accommodating themselves to any irregularities in the surface over which the device is moved.

A second conveyer section B, comprising a pair of transversely spaced and longitudinally extending channel members 18, 18 having rollers 19 journalled therebetween, is slidable along and movable longitudinally with respect to conveyer section A. The conveyer section B when in the retracted position as shown in Figure 1, is supported adjacent its inner end by a pair of flanged wheels 20, 20 that engage the tops of the channel members 3, 3 as shown in Figure 4. These wheels are rotatably mounted on an axle 21 which is carried by suitable brackets 22, 22 that depend from the channels 18, 18. The opposite end portion of conveyer section B is supported by a pair of arms 23, which are pivotally mounted on the sides of conveyer frame A. These arms may be swung about their pivot points to fold along the conveyer frame A as shown in Figure 3, or each may be swung to erected position as shown in Figure 1, so that the upper end engages beneath an arcuate shaped flange 24 on the side of conveyer frame B. Each arm is preferably so constructed and arranged, that it will swing slightly beyond the vertical and the lower projecting end thereof will engage a stop 25 on conveyer frame A.

The outer end of the conveyer frame B, when in the extended position, as shown in Figure 3, or while it is being extended with respect to frame A, is supported by a pair of caster wheels 28 that are carried by an axle 29, which in turn is carried by a frame 30 depending from the outer ends of the side frames 18 of conveyer frame B. When the section B is in the retracted position, the caster wheels 28 are elevated from the ground, but as the section B is extended, these wheels engage the ground to support the overhanging end of section B and in some instances, as in the case of trucks and similar vehicles, the caster wheels 28 are adapted to roll along the floor of the body of the vehicle. When the conveyer section B has been extended to the desired extent, the caster wheels 28 are locked against rotation in any suitable manner, as for example, by means of a vertically disposed rod 31, the lower end of which is adapted to engage in any one of a plurality of apertures 32 in the periphery of one of the caster wheels. The upper end of this rod is pivotally connected to an operating lever 33 which is pivotally fastened at one end to frame 30.

Pivotally secured to the inner end of conveyer section B is a short length of gravity roller conveyer 36, the opposite end of which is provided with flanged wheels 37 that roll along the top surfaces of the side frames 3, 3 of conveyer section A as the section B is extended or retracted.

The drive mechanism for the conveyer belt 5 comprises a gear head motor 40, the power shaft of which is fitted with a sprocket wheel 41 which is connected by an endless chain 42 to sprocket wheels 43 and 44. These sprocket wheels are mounted concentric with and serve to drive suitable drive rollers 45 and 46 for the conveyer belt 5. The aforementioned drive mechanism is conveniently located within the confines of the main supporting framework 1. Also journalled within the confines of this framework are a pair of conveyer belt take-up rollers 47 and 48, the latter being slidably mounted and normally urged in a direction to the right as viewed in Figure 1, by means of spring 49 interconnected between said roller mounting and a portion of the framework 1.

The endless conveyer belt 5 passes over power driven rollers 45 and 46, thence around take-up rollers 47 and 48, and over a roller 50 that is journalled in arms 51 which project from the U-shaped frame 11 of the swivel caster wheel support. The belt 5 then passes through the U-shaped frame 11 and under roller 8 at the outer end of conveyer section A. From this point, the belt extends upwardly and around the roller at the outer end of conveyer section B, then along the tops of the rollers 19 and around the roller at the inner end of said section, from which point, it extends forwardly and around roller 7. From this roller, the belt extends inwardly over the tops of rollers 4 in section A and around the roller at the inner end of said section, thence outwardly to the power driven roller 45.

In operation, and with the device in the retracted position shown in Figure 1, the conveyer is in compact form and may be easily moved about on the wheels 2 and 14. When moved to the desired position the arms 23 are folded along the side rails 3, 3 and the upper conveyer section B is then manually pushed outwardly with respect to conveyer section A to the desired extent. During such outward movement, the handle 33 is lifted so as to permit caster wheels 28 to rotate freely and support the outer end of conveyer section B and when the desired extension is reached, the handle 33 is then lowered to lock the wheels 28 against rotation. The device will then be in a position similar to that illustrated in Figure 3 and the motor 40 is now started to drive the conveyer belt 5. It will be obvious, that with the belt 5 traveling in the direction of the arrows in Figures 1 and 3, articles placed on the outer end of section B will move inwardly with the belt 5 and be discharged onto the gravity roller section 36 and pass downwardly thereover and onto the portion of belt 5 that is moving rearwardly over the rollers 4 in section A. The inner end of this conveyer section may discharge directly to any desired receptacle or to an independent conveyer indicated generally at 52.

When the conveyer is no longer needed, the handle 33 is lifted and conveyer section B is pushed back or telescoped over conveyer section A to the position shown in Figure 1, whereupon the entire device may be easily rolled to its storage location or to another station of unloading.

It will be noted that, by reason of the arrangement of the belt 5 over the two conveyer sections and power drive therefor, the belt is always maintained at its proper tension irrespective of the relative position of conveyer section A with respect to section B.

What I claim is:

1. A conveyer of the character described comprising a wheeled support, a conveyer unit mounted on said support and having side frames extending longitudinally beyond each end of said support, caster wheels supporting the outer end portion of said conveyer unit, a second conveyer unit having a pair of wheels adjacent its inner end portion engaged with the side frames of the first mentioned unit and the outer end of said second unit having a ground engaging wheel whereby said second conveyer unit may be moved longitudinally with respect to the first mentioned conveyer unit, a single endless belt passing over the top surfaces of said conveyer units in the same direction, said belt being arranged in overlapping loops to permit the second unit to move longitudinally with respect to the first unit without substantial variation of tension of the belt, and means for driving said belt.

2. A conveyer of the character described comprising a wheeled support, a conveyer unit mounted on said support and having side frames extending longitudinally beyond each end of said support, caster wheels supporting the outer end portion of said conveyer unit, a second conveyer unit having a pair of wheels adjacent its inner end portion engaged with the side frames of the first mentioned unit and the outer end of said second unit having a ground engaging wheel whereby said second conveyer unit may be moved longitudinally with respect to the first mentioned conveyer unit, means carried by one of said units and adapted to engage the other unit to elevate the outer end and the ground engaging wheel of said second unit when said conveyer is in retracted position, a single endless belt passing over the top surfaces of said conveyer units in the same direction, said belt being arranged in overlapping loops to permit the second unit to move longitudinally with respect to the first unit without substantial variation of tension of the belt, and means for driving said belt.

3. A conveyer of the character described comprising a wheeled support, a conveyer unit mounted on said support and having side frames extending longitudinally beyond each end of said support, caster wheels supporting the outer end portion of said conveyer unit, a second conveyer unit having a pair of wheels adjacent its inner end portion engaged with the side frames of the first mentioned unit and the outer end of said second unit having a ground engaging wheel whereby said second conveyer unit may be moved longitudinally with respect to the first mentioned conveyer unit, a third conveyer unit pivotally connected at one end to the inner end portion of said second unit and having the opposite end slidably mounted on the side frames of the first mentioned unit, a single endless belt passing over the top surfaces of said first and second mentioned conveyer units in the same direction, said belt being arranged in overlapping loops to permit the second and third units to move longitudinally with respect to the first unit without substantial variation of tension of the belt, and means for driving said belt.

WILLIAM J. ZINK.